United States Patent
Chauray et al.

(10) Patent No.: US 7,556,853 B2
(45) Date of Patent: Jul. 7, 2009

(54) HIGH TOUGHNESS VINYLESTER AND/OR EPOXY RESIN-BASED MATERIAL, ITS PROCESS OF MANUFACTURE, COMPOSITE MATERIAL COMPRISING IT AND USES THEREOF

(75) Inventors: Estelle Chauray, Pessac (FR); Brigitte Defoort, Saint Medard en Jalles (FR); Frederic Boursereau, Le Bouscat (FR); Alain Soum, Gradignan (FR)

(73) Assignee: Astrium SAS, Paris (FR)

( * ) Notice: Subject to any disclaimer, the term of this patent is extended or adjusted under 35 U.S.C. 154(b) by 0 days.

(21) Appl. No.: 12/053,995

(22) Filed: Mar. 24, 2008

(65) Prior Publication Data
US 2008/0171207 A1    Jul. 17, 2008

Related U.S. Application Data

(62) Division of application No. 10/832,377, filed on Apr. 27, 2004, now Pat. No. 7,371,801.

(30) Foreign Application Priority Data
May 2, 2003    (FR) .................................. 03 50138

(51) Int. Cl.
    *B32B 27/04*    (2006.01)
(52) U.S. Cl. .................................. 428/297.4; 428/413
(58) Field of Classification Search .............. 428/297.4, 428/409, 413, 523
See application file for complete search history.

(56) References Cited
U.S. PATENT DOCUMENTS
4,680,076 A    7/1987    Bard 5,270,435 A    12/1993    Pfaendner et al.
5,434,226 A    7/1995    Nguyen et al.

(Continued)

FOREIGN PATENT DOCUMENTS

JP    2001-164090    6/2001
WO    WO 97/43339    11/1997

OTHER PUBLICATIONS

S. Wang, et al., Journal of Polymer Science: Part B: Polymer Physics, vol. 38, XP-002266573, pp. 2409-2421, "Miscibility and Morphologies of Poly(Arylene Ether Phenyl Phosphine Oxide/Sulfone) Copolymer/Vinyl Ester Resin Mixtures and Their Cured Networks", 2000.

(Continued)

*Primary Examiner*—N. Edwards
(74) *Attorney, Agent, or Firm*—Oblon, Spivak, McClelland, Maier & Neustadt, P.C.

(57) ABSTRACT

The invention relates to a material with high fracture toughness based on a vinyl ester resin and/or on an epoxide resin and to its process of manufacture.

This material comprises at least one polymerized resin chosen from vinyl ester resins and epoxide resins which can be polymerized at a temperature of less than 70° C. and their blends, and a thermoplastic adjuvant present in this resin in the form of particles, and exhibits a fracture toughness ($K_{Ic}$) of greater than or equal to 1.2 MPa·m$^{1/2}$ as determined according to Standard ISO 13586:2000.

It also relates to a composite material comprising a matrix composed of said material and a reinforcement.

Applications: automobile, railway, ship-building, aeronautical, aerospatial and other industries.

19 Claims, 1 Drawing Sheet

A                    B

U.S. PATENT DOCUMENTS

| | | | |
|---|---|---|---|
| 5,726,216 | A | 3/1998 | Janke et al. |
| 5,939,472 | A | 8/1999 | Ito et al. |
| 6,429,157 | B1 | 8/2002 | Kishi et al. |
| 7,371,801 | B2 * | 5/2008 | Chauray et al. ............. 525/391 |
| 2002/0147283 | A1 | 10/2002 | Kim et al. |
| 2005/0008866 | A1 * | 1/2005 | Chauray et al. ............. 428/413 |
| 2005/0014910 | A1 * | 1/2005 | Lepilleur et al. ............. 525/524 |
| 2008/0171207 | A1 * | 7/2008 | Chauray et al. ............. 428/409 |

OTHER PUBLICATIONS

D. J. Riley, et al., (McGrath, et al.), Polymer Engineering and Science, vol. 37, No. 9, pp. 1501-1511, "Synthesis and Characterization of Flame Resistant Poly(Arylene Ether)S", Sep. 1997.

* cited by examiner

HIGH TOUGHNESS VINYLESTER AND/OR EPOXY RESIN-BASED MATERIAL, ITS PROCESS OF MANUFACTURE, COMPOSITE MATERIAL COMPRISING IT AND USES THEREOF

CROSS-REFERENCE TO RELATED APPLICATIONS

The present application is a divisional of U.S. patent application Ser. No. 10/832,377, filed on Apr. 27, 2004 now U.S. Pat. No. 7,371,801, which claims priority to French patent application FR 0350138, filed on May 2, 2003.

TECHNICAL FIELD

The present invention relates to a material with high fracture toughness based on a vinyl ester resin and/or on an epoxide resin, and to its process of manufacture.

It also relates to a composite material composed of an organic matrix with high fracture toughness based on a vinyl ester and/or epoxide resin and on a reinforcement, and to the uses of this composite material.

Such a composite material is of use in a great many fields, such as the automobile, railway, ship-building, aeronautical and aerospatial industries, whether in the manufacture of structural components, of engine components, of passenger compartment components or of bodywork components, the armaments industry, for example in the manufacture of missiles and of missile launch tubes, or in the field of leisure and sports, for example in the manufacture of articles intended for water sports and for sports which involve sliding.

In particular, the composite material according to the invention is capable of being used in the manufacture of all the components which can be made from a composite material by winding, drape forming or preform and RTM (Resin Transfer Moulding) in the construction of an aircraft, such as beams, wing boxes, elevons, doors, fuselage or fairing elements, and the like, or in the construction of a rocket, such as solid-fuel booster casings, tanks (cryogenic or noncryogenic), skirts, fairing elements, engine frames, and the like, or the construction of a satellite (structures, tanks, and the like).

STATE OF THE PRIOR ART

Composite materials make it possible to make use of the exceptional mechanical properties of certain materials, the manufacture of which in bulk form is not known but only in the form of filaments. Organic polymers (resins) are then used as matrices for binding the filaments to one another. However, if it is desired to obtain high performance composite materials, it is essential for the matrices themselves to have good mechanical properties.

In point of fact, generally, "thermosetting" resins, in contrast to "thermoplastic" resins, such as polyester, epoxide and vinyl ester resins, are rigid after polymerization and exhibit a mediocre elongation at break and a mediocre impact strength.

It has been known for a long time that the fracture toughness of a material, that is to say its ability to withstand the sudden propagation of cracks, can be improved by incorporating small particles therein. This is because, when a crack is formed in the material, the propagation of this crack is slowed down by the particles, which act as reinforcements. Plastic deformation mechanisms, and in particular phenomena of cavitation and of shearing strips, then provide reinforcement of the material.

The idea generally considered for overcoming the low fracture toughness of "thermosetting" resins is thus to incorporate therein a thermoplastic polymer, the role of which is to concentrate the stresses and to regulate the energy given off during impact on or cracking of the resulting material. Conventionally, this incorporation is carried out in two stages: a first stage of blending the thermoplastic polymer and the thermosetting resin, then a second stage of polymerizing the resulting blend at high temperature, which is accompanied by phase separation or demixing, resulting in the formation of thermoplastic nodules within the resin.

As regards heat-polymerized epoxide resins, polyethersulphone (PES), a high performance thermoplastic polymer having a high glass transition temperature (greater than 200° C.), is widely used. An example of such a use is disclosed in U.S. Pat. No. 5,434,226 [1].

However, this thermoplastic polymer cannot be used to improve the fracture toughness of vinyl ester resins for the simple reason that it is not miscible with them.

Recently, a study carried out by Wang et al. (*Journal of Polymer Science*, 38, 2409-2421 [2]) has demonstrated the possibility of improving the fracture toughness of a heat-polymerized bisphenol A epoxy vinyl ester resins by the incorporation of a thermo-plastic copolymer based on bisphenol A and on sulphone and phosphine oxide groups, namely a poly(arylene ether diphenyl sulphone/arylene ether triphenylphosphine).

In this study, this copolymer is dissolved in the vinyl ester resin at 80° C. and then, after addition of a crosslinking initiator to the resulting blend and degassing of this blend, the latter is crosslinked at 100° C. for 1 hour and then at 140° C. for 1 hour.

Wang et al. show that an increase in the proportion of phosphine oxide groups in the copolymer is reflected by an increase in its solubility in the vinyl ester resin and that miscibility is obtained for contents of phosphine oxide groups of greater than or equal to 20%. Furthermore, they show that the presence of 5% by weight of copolymer in the vinyl ester resin is sufficient to significantly improve the fracture toughness of this resin, this being the case independently of the content of phosphine oxide groups exhibited by the copolymer.

However, these authors note that a phase inversion is generally produced during the crosslinking of the resin/copolymer blends, so that the materials obtained are composed of a continuous thermoplastic phase in which vinyl ester resin particles are dispersed.

Such a phase inversion is unacceptable as it is reflected by a deterioration in the "specific" properties of the vinyl ester resin and in particular in its thermal and mechanical properties.

The problem is thus posed of managing to improve the fracture toughness of vinyl ester resins without, for all that, detrimentally affecting their other properties, which are at the root of their use as matrices in composite materials.

In point of fact, the inventors, continuing their studies on the improvement in the fracture toughness of "thermosetting" resins, have found that, surprisingly, it is possible, by subjecting blends comprising a vinyl ester resin and a thermoplastic copolymer of the type of that provided by Wang et al. to polymerization under cold conditions, that is to say polymerization in the absence of any heating, to obtain materials which exhibit a particularly high fracture toughness and which nevertheless retain the other properties of the vinyl ester resin.

The inventors have also found that this is also true in the case of blends comprising an epoxide resin, alone or in combination with a vinyl ester resin, and such a copolymer.

It is these observations which form the basis of the present invention.

DISCLOSURE OF THE INVENTION

A first subject-matter of the invention is thus a material comprising at least one polymerized resin chosen from vinyl ester resins and epoxide resins which can be polymerized at a temperature of less than 70° C. and their blends, and a thermoplastic adjuvant present in this resin in the form of particles, said material exhibiting a fracture toughness ($K_{Ic}$) of greater than or equal to 1.2 MPa·m$^{1/2}$ as determined according to Standard ISO 13586:2000.

According to a first preferred arrangement of the material in accordance with the invention, the thermoplastic adjuvant is a poly(arylene ether diphenyl sulphone/arylene ether triphenylphosphine).

In what follows, this thermoplastic copolymer, which corresponds to the following formula (I):

the dissolution of the BPA-Px in the resin and their miscibility is obtained by the establishment of hydrogen bonds between the phosphine oxide functional groups of the thermoplastic and the hydroxyl groups of said resin.

In the context of the invention, it is considered that a resin can be polymerized at a temperature of less than 70° C. when at least 60% and preferably 80% or more of the reactive functional groups of the prepolymer(s) or monomer(s) which constitute it are capable of being converted in the presence of a polymerization initiator and/or under the effect of a treatment other than heating at 70° C. or more, this polymerization occurring in a reasonable time, that is to say in practice of less than 24 hours and preferably of less than 12 hours.

The resin, when it is a vinyl ester resin, can just as easily be a resin including, as polymerizable compounds, only vinyl ester prepolymers as a resin additionally comprising a reactive monomer diluent, such as styrene or divinylbenzene.

However, it is preferable to use a resin which includes only vinyl ester prepolymers, for reasons of simplicity of processing and of costs, this being because the reactive diluents are (I)

is recorded as BPA-Px, x representing the content of phosphine oxide groups with respect to all the phosphine oxide and sulphone groups present in the copolymer and thus being determined by the formula:

$$x = \frac{n}{m+n} \times 100$$

The synthesis of this copolymer has been described by McGrath et al. in *Polymer Engineering and Science*, 37, 9, 1501-1511, 1997 [3].

In this case, the resin is preferably chosen from vinyl ester resins and epoxide resins which, in addition to being able to generally toxic and volatile, which requires that numerous safety measures be observed and therefore that expensive equipment be used.

Having specified this, the vinyl ester resin can be chosen from bisphenol A epoxy vinyl ester resins, novolac epoxy vinyl ester resins, "mixed" epoxy vinyl ester resins comprising bisphenol A units and novolac units and brominated bisphenol A epoxy vinyl ester resins and brominated novolac epoxy vinyl ester resins.

Mention may be made, as examples of vinyl ester resins capable of participating in the formation of materials in accordance with the invention, of:

the bisphenol A epoxy vinyl ester resin sold by UCB under the commercial reference EB600, the prepolymers of which correspond to the following formula (II):

(II)

be polymerized at a temperature of less than 70° C., comprise free hydroxyl groups, and from their blends. This is because the presence of such groups proves to significantly facilitate in which n is equal to 1 or to 2;

the novolac epoxy vinyl ester resin sold by UCB Chemicals under the commercial reference EB629, which is diluted with 30% of trimethylolpropane triacrylate (TMPTA) and 5% of hydroxyethane monoacrylate (HEMA), the prepolymers of which correspond to the following formula (III):

in which n is equal to 3;

the "mixed" vinyl ester resin sold by UCB Chemicals under the commercial reference EB620, the prepolymers of which correspond to the following formula (IV):

the brominated bisphenol A epoxy vinyl ester resins sold by Dow Chemicals under the commercial reference DER 510A, the prepolymers of which correspond to the following formula (V):

If it is an epoxide resin, then the latter can be chosen from epoxide resins of bisphenol A type and epoxide resins of novolak type.

Mention may be made, as examples of epoxide resins capable of participating in the formation of materials in accordance with the invention, of:

the epoxide resins of bisphenol A type sold by Shell under the commercial references Epon 828, Epon 826 and Epon 825 and by Dow Chemicals under the commercial references DER 332, DER 331, DER 330, Tactix 123 and Tactix 128, the prepolymers of which correspond to the following formula (VI):

in which n is an integer ranging from 0 to 12; and the epoxide resins of novolak type sold by Shell under the commercial references Epon 862 and Epon 155 and by Dow Chemicals under the commercial references DER 354, DEN 431, DEN 438 and DEN 439, the prepolymers of which correspond to the following formula (VII):

(VII)

in which n is an integer ranging from 0 to 5.

In accordance with the invention, the material can also comprise a blend of a vinyl ester resin and of an epoxide resin. This blend can be prepared from a vinyl ester resin and from an epoxide resin which are synthesized or sold separately, such as, for example, those mentioned above, or else can be a ready-to-use blend, such as that sold by UCB Chemicals under the reference EB3605 and which includes the prepolymers of following formulae (VIIIa), (VIIIb) and (VIIIc):

In a particularly preferred way, the molar ratio of the phosphine oxide groups to the sulphone groups ranges from 20/80 to 30/70.

According to another preferred arrangement of the material in accordance with the invention, the resin and the thermoplastic adjuvant are present in this material in a ratio by weight ranging from 95/5 to 80/20, preferably from 95/5 to 85/15 and better still from 90/10 to 85/15.

The material in accordance with the invention can comprise, in addition to the resin and the thermoplastic adjuvant, other adjuvants which will be chosen according to the use for which it is intended and the specific properties which it is desired to confer on it according to this use. These adjuvants can in particular be plastic, curable or elastomeric polymers, preferably with low molecular weights, capable of improving certain properties of the vinyl ester and epoxide resins, such as, for example, acrylates, but also fillers, in particular inorganic fillers, flexibilizing agents, plasticizers, thixotropic agents, flame retardants, UV stabilizers, wetting agents, antishrink agents, colourants, and the like, all these adjuvants and their use in the manufacture of materials based on vinyl ester and/or epoxide resins being well known to a person skilled in the art.

Preferably, the material has a fracture toughness of greater than or equal to 1.3 MPa·m$^{1/2}$, preferably of greater than or equal to 1.4 MPa·m$^{1/2}$ and better still of greater than or equal to 1.5 MPa·m$^{1/2}$.

Its thermal properties, such as its glass transition temperature, and its other mechanical properties, such as the modulus in a vinyl ester resin/epoxide resin molar ratio of 50/50.

Whatever the resin used, the BPA-Px preferably exhibits a molar ratio of the phosphine oxide groups to the sulphone groups which is at least equal to 20/80 and which does not exceed 40/60. In other words, use is preferably made of BPA-Px copolymers exhibiting a content of phosphine oxide groups which is at least equal to 20% and which does not exceed 40% with respect to all the phosphine oxide and sulphone groups present in these copolymers. This is because the inventors have been able to confirm that a content of phosphine oxide groups of less than 20% is reflected by greater difficulties in obtaining dissolution of the BPA-PX in the resin and their miscibility, whereas a content of greater than 40% results in fully miscible systems at ambient temperature, which is not advantageous from the viewpoint of the improvement in the fracture toughness.

of elasticity or the breaking stress, are, however, comparable with those of the resin included therein. It is therefore particularly well suited to acting as matrix in composite materials.

A subject-matter of the invention is consequently a process for the manufacture of a material as defined above, which process comprises the following stages:

a) dissolving the thermoplastic adjuvant in the resin, in order to produce a homogeneous blend;

b) casting the blend in an appropriate mould and degassing it;

c) placing the blend under conditions suitable for producing demixing thereof; and d) polymerizing the blend under cold conditions.

The term "polymerization under cold conditions" is understood to mean any polymerization which is carried out in the absence of heating and in particular polymerization brought about by radiation, such as electron beam ionization, ultraviolet irradiation (in conjunction with the action of a photoinitiator), infrared irradiation or X-rays, this radiation being chosen according to the material which has to be manufactured.

This is because polymerization by electron beam ionization exhibits the advantage of being the fastest but it can only be used for the manufacture of thin materials (that is to say, in practice, with a thickness of a few cm). The polymerization induced by UV irradiation is also very fast but it is reserved for the manufacture of transparent materials, while the polymerization induced by X-rays is slower but it makes possible the polymerization of materials with a thickness of several tens of cm.

In an alternative form, the polymerization can also be carried out without using radiation, in which case it is advisable to add to the resin, immediately before the polymerization, a polymerization initiator, such as an organic peroxide (methylethylketone peroxide, cyclohexanone peroxide, and the like) in the case of a vinyl ester resin, an amine or an acid anhydride in the case of an epoxide resin.

When the thermoplastic adjuvant is a BPA-Px, then, in stage a), the latter is dissolved in the resin, brought beforehand to a temperature of the order of 60 to 90° C., optionally in the presence of a non-reactive solvent, such as, for example, tetrahydrofuran, in which case the solvent is secondarily removed from the blend.

Furthermore, in stage c), the demixing of the blend can be obtained by placing it at ambient temperature or subjecting it to gentle heating, that is to say to a temperature not exceeding 70° C., until the separation of the blend into two phases develops no further.

A further subject-matter of the invention is a composite material comprising a matrix and a reinforcement in this matrix, in which said matrix is composed of a material as defined above.

In accordance with the invention, the reinforcement can be of various types. Thus, it can be a reinforcement composed of glass fibres, of carbon fibres, of metal fibres, such as steel fibres, aluminium fibres or boron fibres, of organic fibres, such as aramid fibres, polyethylene fibres, polyester fibres or polybenzoxazole (PBO) fibres, or silicon carbide fibres, it being possible for this reinforcement to be provided, according to the nature of the fibres of which it is composed, in the form of cut yarns, of milled fibres, of mats comprising continuous filaments, of mats comprising cut filaments, of rovings, of woven fabrics, of knitted fabrics, of felts, and the like, or in the form of complexes prepared by combining different types of flat reinforcements.

Preferably, according the invention, the reinforcement is chosen from glass fibres, carbon fibres, aramid fibres, polybenzoxazole fibres and boron fibres.

The incorporation of the reinforcement in the matrix can be carried out by any known technique for reinforcing vinyl ester and epoxide matrices. On this point, the reader may, for example, refer to "TECHNIQUES DE L'INGENIEUR" [Techniques of the Engineer], Plastiques et Composites, Volume AM5.

Finally, a subject-matter of the present invention is the use of a composite material as defined above in the manufacture of components for the aeronautical or aerospatial industry.

Other characteristics of the invention will become more clearly apparent on reading the additional description which follows, which relates to an example of the preparation of materials in accordance with the invention and of the demonstration of their properties, and with reference to the appended drawings.

It goes without saying that this additional description is given by way of illustration and without implied limitation of the subject-matter of the invention.

DETAILED DESCRIPTION OF SPECIFIC EMBODIMENTS

The example which follows illustrates the preparation of materials in accordance with the invention from:

the bisphenol A epoxy vinyl ester resins referenced EB600 from UCB, the prepolymers of which correspond to the formula (II) indicated above; and random poly(arylene ether diphenyl sulphone/arylene ether triphenylphosphine) copolymers synthesized by the inventors. This synthesis, which is described below, was carried out for the purpose of obtaining BPA-Px copolymers in which x is equal to 20, to 30 or to 70 (that is to say, copolymers exhibiting a priori a molar ratio of the phosphine oxide groups to the sulphone groups of 20/80, 30/70 and 70/30 respectively). In what follows, these copolymers are thus referred to respectively as BPA-P20, BPA-P30 and BPA-P70.

a) Synthesis of the Copolymers BPA-P20, BPA-P30 and BPA-P70:

Two copolymers BPA-P20, two copolymers BPA-P30 and one copolymer BPA-P70 are synthesized by aromatic nucleophilic substitution between the hydroxyl functional groups of a bisphenol A (Bis A, Sigma Aldrich) and the halogen functional groups of bis(4-fluorophenyl)phenylphosphine oxide (BFPPO, Sigma Aldrich) and of 4-chlorophenyl sulphone (DCDPS, Sigma Aldrich) in a solvent composed of a dimethylacetamide (DMAc)/toluene 70/30 mixture in the presence of calcium carbonate ($K_2CO_3$), as described in the document [3].

In practice, the bisphenol A, the BFPPO and the DCDPS are placed in a three-necked round-bottomed flask, in molar ratios suitably chosen according to the molar ratio of the phosphine oxide groups to the sulphone groups which has to be exhibited by the BPA-Px, in conjunction with a 15 mol % excess of $K_2CO_3$. The DMAc/toluene mixture (prepared after drying the toluene over $CaH_2$, followed by distillation) is then added and the combined mixture is placed under a stream of nitrogen to remove any trace of oxygen, this being because the latter may be responsible for undesirable radical-type reactions.

The reaction medium is placed at 140-145° C., still under a stream of nitrogen, to distil off the toluene, for the time necessary to completely remove the toluene from the reaction medium, i.e. approximately 8 hours. The reaction medium is then left at 160° C. for 16 hours in order to obtain a BPA with the highest possible molar mass. The total reaction time is 24 hours.

The reaction medium, which, under hot conditions, is dark pink with a white and viscous precipitate stuck to the wall of the three-necked flask and which gradually turns yellow on cooling, is brought back to ambient temperature, diluted with dichloro-methane, filtered and acidified with acetic acid to protonate the end phenol groups. The BPA-Px is precipitated from methanol, redissolved in dichloro-methane, reprecipitated from methanol, filtered off and dried under vacuum at 150° C. for 24 hours.

More specifically, the BPA-P20 copolymers are synthesized using:

Cop. 1 BPA-P20:
Bis A: 9.1563 g (0.0401 mol)
DCDPS: <9.3 g (<0.00324 mol)
BFPPO: 2.5109 g (0.0079 mol)
DMAc: 278 ml, toluene: 115 ml Cop. 2 BPA-P20:
Bis A: 9.1532 g (0.0400 mol)
DCDPS: 9.1914 g (0.0320 mol)
BFPPO: 2.5341 g (0.0080 mol)
DMAc: 280 ml, toluene: 121 ml The BPA-P30 copolymers are synthesized using:

Cop. 1 BPA-P30:
Bis A: 9.1400 g (0.0400 mol)
DCDPS: 8.0495 g (0.0280 mol)
BFPPO: 3.7794 g (0.0120 mol)
DMAc: 280 ml, toluene: 119 ml Cop. 2 BPA-P30:
Bis A: 9.1344 g (0.0400 mol)
DCDPS: 8.0585 g (0.0280 mol)
BFPPO: 3.7794 g (0.0120 mol)
DMAc: 280 ml, toluene: 119 ml The BPA-P70 copolymer is for its part synthesized using:

Bis A: 9.1284 g (0.0399 mol)
DCDPS: 3.4476 g (0.0120 mol)
BFPPO: 8.7995 g (0.0279 mol)
DMAc: 282 ml, toluene: 120 ml The following are determined for each copolymer thus synthesized:
its molar mass Mn and its polydispersity index I by steric exclusion chromatography in tetrahydrofuran (THF) with a double-detection Varian 5500 chromatograph (differential refractometer and UV spectrometer at 254 nm) equipped with a "High Speed" PSS column, at a flow rate of 1 ml/min and using polystyrene calibration.

the molar ratio $R_{(P/S)}$ of the phosphine oxide groups to the sulphone groups which it really exhibits, by 200 MHz nuclear magnetic resonance in $CDCl_3$ with a Bruker AC200 device; and its glass transition temperature Tg by differential calorimetric analysis with a DSC7 device from Perkin-Elmer Instruments, at a rate of 10° C./min in a temperature range from 100 to 250° C.

The values obtained are presented in Table 1 below.

TABLE 1

| Copolymers | $R_{(P/S)}$ | Mn (g/mol) | I | Tg (° C.) |
|---|---|---|---|---|
| Cop. 1 BPA-P20 | 22/78 | 15 000 | 2 | 192 |
| Cop. 2 BPA-P20 | 22/78 | 23 000 | 2 | 195 |
| Cop. 1 BPA-P30 | 31/69 | 20 000 | 2.3 | 198 |
| Cop. 2 BPA-P30 | 31/69 | 30 000 | 2 | 197 |
| Cop. BPA-P70 | 54/46 | 3000 | 2.6 | 204 | b) Preparation of the EB600 Resin/BPA-Px Blends:

Six different blends, hereinafter referred to as blends 1 to 6, composed of EB600 resin and of one of the BPA-Px copolymers synthesized in part a), are prepared by dissolving each BPA-Px in 200 to 300 ml of THF and by then gradually adding the solution obtained to 120 g of EB600 resin placed at 80° C., with vigorous stirring. The temperature of the blends is increased to 110° C. and the blends are left stirring for several hours until the solvent has completely evaporated. They are subsequently placed in an oven under vacuum to remove possible traces of solvent.

For each of the blends 1 to 6, the BPA-Px copolymer present therein and the ratio by weight of the EB600 resin to this copolymer are specified in Table 2 below.

TABLE 2

| Blends | Copolymers | EB600/BPA-Px (w/w) |
|---|---|---|
| 1 | Cop. 1 BPA-P20 | 95/5 |
| 2 | Cop. 1 BPA-P20 | 90/10 |
| 3 | Cop. 2 BPA-P20 | 85/15 |
| 4 | Cop. 1 BPA-P30 | 90/10 |
| 5 | Cop. 2 BPA-P30 | 86/14 |
| 6 | Cop. BPA-P70 | 90/10 | c) Demixing of the Resin/BPA-Px Blends:

The blends 1 to 6 are cast in moulds, are degassed and are stored at ambient temperature for periods of time ranging from 3 to 8 days to allow demixing to occur.

d) Polymerization of the Resin/BPA-Px Blends:

The blends are polymerized by ionization under an electron beam at doses of 100 kGy with successive passes of 25 kGy.

e) Properties of the Materials Obtained:

The materials resulting from the polymerization of the EB600 resin/BPA-Px blends are subjected to tests targeted at determining their glass transition temperature Tg, their modulus of elasticity, their breaking stress and their fracture toughness $K_{Ic}$.

Glass Transition Temperature:

The glass transition temperature is determined by dynamic mechanical analyses (DMA) using a DMA7 device from Perkin-Elmer Instruments, this being because this technique exhibits the advantage of only subjecting the materials analyzed to very low strains and therefore of not modifying the structure thereof.

The measurements are carried out in three-point bending at 1 Hz.

The test device is composed of two outer triangular supports 15 mm apart, their length being at least 10 mm. The punch, with a diameter of 2 mm, is centred with respect to the outer supports. The glass transition temperature is determined from the curve giving the damping factor (tan δ) as a function of the temperature. The temperature programme is 10° C./min for a temperature scan from 0 to 300° C.

Modulus of Elasticity and Breaking Stress:

The modulus of elasticity and the breaking stress of the materials are determined during tests of failure in three-point bending.

These tests are carried out using an Instron 4400R testing device equipped with a load cell of 10 kN, with an Instron 8500 controller and with a computer system for data processing (Instron series IX software).

The testing device is composed of a steel block supporting the two outer supports, which are 35 mm apart. The diameter of the supports is 10 mm, their length being at least 15 mm. The punch, with a diameter of 25 mm, is centred with respect to the outer supports. The force is applied in the plane of symmetry of the test specimens and of the testing assembly.

The test consists in measuring the force necessary to break a test specimen of parallelepipedal shape (50×10×2 mm$^3$). It is carried out at a constant rate of displacement of the crosshead (2 mm/min). The force and the direction are measured and recorded at the same time. The breaking stress and the flexural modulus and the breaking strain are evaluated from the stress/strain curve.

Fracture Toughness:

The critical stress intensity factor or fracture toughness of a material is recorded as $K_{Ic}$. Its measurement is based on the analysis of the stress field around the crack.

In the present case, this fracture toughness is measured by tests carried out in accordance with Standard ISO 13586:2000, which sets the methods for the tests of fracture toughness of plastics according to the mode of opening of the crack (mode I).

As this standard provides two types of tests, namely three-point bending tests and tensile tests on compact test specimens, the fracture toughness tests are carried out by three-point bending tests because of greater ease of machining of the test specimens.

Figure 1:
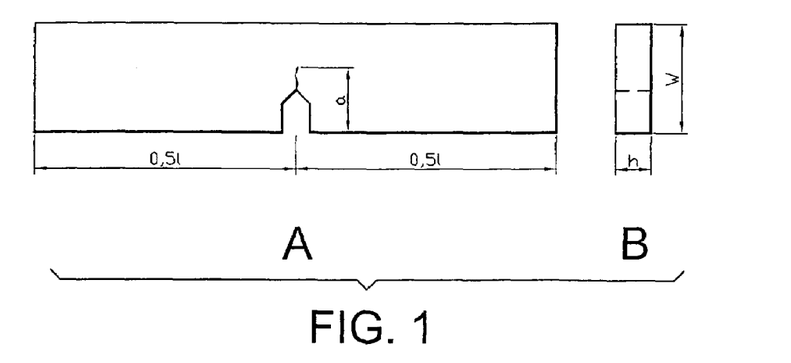
FIG. 1 diagrammatically illustrates a test specimen, top view (part A) and side view (part B), as used in the fracture toughness tests carried out on materials in accordance with the invention according to Standard ISO 13586:2000.

The test specimens subjected to the three-point bending tests or single edge notch bending (SENB) test specimens are prepared in accordance with FIG. 1, which diagrammatically represents a test specimen seen from above (part A) and seen from the side (part B). In this figure:

w represents the width of the test specimen,
l represents its overall length,
h represents its thickness, while
a represents the length of the crack (notch+pre-crack).

In accordance with Standard ISO 13586:2000:

l must be greater than 4.2w,
h must be less than w/2 while being greater than w/4, and
a must be less than or equal to 0.55w while being greater than or equal to 0.45w.

The following are chosen in the context of the present tests: a=5 mm+ϵ, where ϵ is the length of the precrack, h=5 mm, w=10 mm and l=56 mm.

The method supposes linear elastic behaviour of the materials with planar deformation at the tip of the crack. It is therefore necessary for the crack to be sufficiently sharp for the values which it makes it possible to obtain for the properties measured not to be substantially higher than those which would be obtained with an even sharper crack.

The precrack is produced using an Instron 4466 device equipped with a load cell of 500 N, with an Instron 8500 controller and with a computer system for data processing (Instron series IX software). A razor blade is fixed by a clamping jaw to the upper end, whereas a plate is placed below. The notched test specimen is aligned by virtue of the positioning of the blade in the notch. The blade is driven in at a rate of 0.2 or 0.5 mm/min to a maximum depth of 0.15 to 0.4 mm. The conditions of displacement of the razor blade are defined beforehand. According to the standard, the increase in the length of the crack thus obtained has to be greater than 4 times the original radius of the tip of the notch.

The test is carried out on an Instron 4400R testing device equipped with a load cell of 10 kN, with an Instron 8500 controller and with a computer system for data processing (Instron series IX software).

Figure 2:
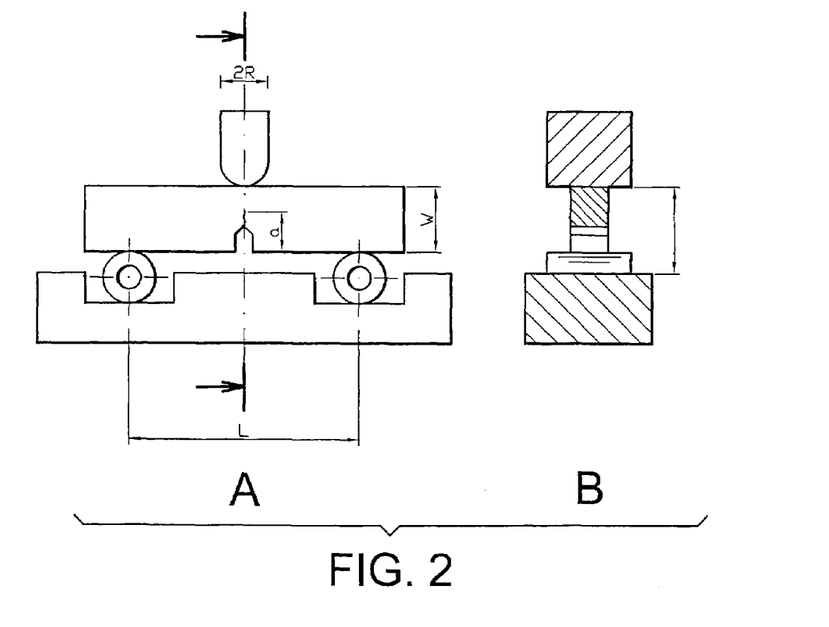
FIG. 2 diagrammatically illustrates the arrangement, top view (part A) and transverse sectional view (part B), as used on an Instron 4400R testing device in the fracture toughness tests carried out on materials in accordance with the invention according to Standard ISO 13586:2000.

The arrangement comprising two rollers and a displacement sensor as used on the Instron 4400R testing device, top view (part A) and transverse sectional view (part B), is illustrated diagrammatically in FIG. 2.

In this figure:

L represents the span,
R represents the radius,
h represents the thickness, while
l represents the distance monitored by the displacement sensor.

L must be equal to 4w±0.1w, while R must be less than w/2 and greater than w/8.

In the context of the present tests, the span is 40 mm and the radius of the rollers is 5 mm.

The critical stress intensity factor $K_{Ic}$ (recorded as $K_Q$ for the time being) is calculated by the following formula:

$$K_Q = \frac{f(a/w) \times F_Q}{h \times \sqrt{w}}$$

in which:

a $F_Q$ is the load at the beginning of the propagation of the crack (maximum load measured on the curve giving the load as a function of the displacement),
h is the thickness of the test specimen,
w is the width of the test specimen,
f(a/w) is the calibration factor related to the geometry, a function of the length a of the crack.

$$f(x) = 6 \times x \times \frac{1.99 - x(1-x)(2.15 - 3.93x + 2.7x^2)}{(1+2x)(1-x)^{3/2}}$$

$$\text{avec } x = a/w$$

The test results should only be regarded as valid if the dimensions of the test specimens are markedly greater than the plastic region surrounding the tip of the crack, characterized by the value $\bar{r}$ defined by the formula:

$$\bar{r} = \frac{K_Q^2}{\sigma_y^2}$$

in which $\sigma_y$ is the yield stress under uniaxial tensile loading or 0.7 times the compressive yield stress.

In order to be regarded as being appropriate for the plane strain fracture tests, the test specimens have to satisfy the three following dimensional criteria:

h>2.5$\bar{r}$
a>2.5$\bar{r}$
(w−a)>2.5$\bar{r}$

Given the test specimen dimensions provided in the standard, it is sufficient for one of the above criteria to be satisfied for all the others to be satisfied.

If the various criteria are satisfied, then $K_Q$ is equal to $K_{Ic}$.

The values of glass transition temperature Tg, of modulus of elasticity, of breaking stress and of critical stress intensity factor $K_{Ic}$ as obtained by the tests described above for materials resulting from the polymerization of the blends 1 to 6, after demixing for 8 days for the blends 1 to 3 and demixing for 3 days for the blends 4 to 6, and those obtained, under the same conditions, for a material composed solely of EB600 resin are presented in Table 3 below. Each value presented in Table 3 corresponds to the mean of the values obtained for 5 to 10 measurements made on different test specimens of the same material.

In addition, it presents the increases in fracture toughness ($\Delta K_{Ic}$), expressed as percentages, exhibited by the materials resulting from the polymerization of the said blends 1 to 6 with respect to the fracture toughness of the EB600 resin alone.

TABLE 3

| Materials | Demixing (days) | Tg (° C.) | Modulus of elasticity (MPa) | Breaking stress (MPa) | $K_{Ic}$ (MPa·m$^{1/2}$) | $\Delta K_{Ic}$ |
|---|---|---|---|---|---|---|
| Blend 1 | 8 | 124.8 | 3775 | 118 | 1.28 ± 0.06 | +60% |
| Blend 2 | 8 | 119.2 | 3850 | 120 | 1.37 ± 0.07 | +71% |
| Blend 3 | 8 | 125.5 | 3709 | 123 | 1.46 ± 0.08 | +82% |
| Blend 4 | 3 | 129.2 | 3695 | 114 | 1.40 ± 0.07 | +75% |
| Blend 5 | 3 | 123.7 | 3747 | 141 | 1.51 ± 0.07 | +88% |
| Blend 6 | 3 | 124 | 3858 | 110 | 1.31 ± 0.08 | +64% |
| EB600 Resin | — | 114 | 3572 | 131 | 0.8 | — |

Table 3 shows that the materials in accordance with the invention all have a fracture toughness of greater than 1.2 MPa·m$^{1/2}$. For five of them, it is greater than 1.3 MPa·m$^{1/2}$ and, for one of them, it is even greater than 1.5 MPa·m$^{1/2}$.

The increase in fracture toughness is thus at least 60% and can reach 88% with respect to the vinyl ester resin from which they were prepared.

It also shows that the materials in accordance with the invention exhibit a glass transition temperature, a modulus of elasticity and a breaking stress which are comparable with those of the vinyl ester resin.

BIBLIOGRAPHY

[1] U.S. Pat. No. 5,434,226
[2] Wang et al., *Journal of Polymer Science*, 38, 2409-2421
[3] McGrath et al., *Polymer Engineering and Science*, 37, 9, 1501-1511, 1997

The invention claimed is:

1. A composite material comprising a matrix, wherein said matrix comprises a reinforcement and a material comprising:
   at least one polymerized resin selected from the group consisting of vinyl ester resins, epoxide resins, and blends thereof; and
   an arylene ether diphenylsulphone/arylene ether triphenylphosphine copolymer dispersed in the form of particles within said at least one polymerized resin,
   wherein the material exhibits a fracture toughness ($K_{Ic}$) of greater than or equal to 1.2 MPa·m$^{1/2}$ as determined according to Standard ISO 13586:2000.

2. The composite material according to claim 1, wherein said reinforcement is selected from glass fibers, carbon fibers, metal fibers, organic fibers and silicon carbide fibers.

3. The composite material according to claim 1, wherein said reinforcement is selected from glass fibers, carbon fibers, aramid fibers, polybenzoxazole fibers and boron fibers.

4. The composite material according to claim 1, wherein said at least one polymerized resin is produced by a process comprising polymerizing, at a temperature of less than 70° C., one or more prepolymers selected from the group consisting of vinyl ester prepolymers and epoxide prepolymers, which can be polymerized at a temperature of less than 70° C., and blends thereof, in the presence of said arylene ether diphenylsulphone/arylene ether triphenylphosphine copolymer.

5. The composite material according to claim 1, wherein said vinyl ester resins and said epoxide resins comprise free hydroxyl groups.

6. The composite material according to claim 5, wherein said at least one polymerized resin is a vinyl ester resin which only comprises vinyl ester prepolymers as polymerizable compounds.

7. The composite material according to claim 1, wherein said at least one polymerized resin is a vinyl ester resin selected from the group consisting of bisphenol A vinyl ester resins, novolac vinyl ester resins, mixed vinyl ester resins comprising bisphenol A units and novolac units, halogenated bisphenol A vinyl ester resins, halogenated novolac vinyl ester resins, and blends thereof.

8. The composite material according to claim 1, wherein said at least one polymerized resin is a vinyl ester resin polymerized from vinyl ester prepolymers according to one of formulae (II), (III) and (IV):

wherein n is 1 or 2;

wherein n is 3; and wherein R is

9. The composite material according to claim 1, wherein said at least one polymerized resin is a vinyl ester resin polymerized from vinyl ester prepolymers consisting of:

a repeating unit of formula:

a first end group of formula:

a second end group of formula:

10. The composite material according to claim 1, wherein said at least one polymerized resin is an epoxide resin polymerized from epoxide prepolymers according to one of formulae (VI) and (VII):

wherein n is an integer ranging from 0 to 12; and

(VII)

wherein n is an integer ranging from 0 to 5.

11. The composite material according to claim 1, wherein said at least one polymerized resin is a blend of a vinyl ester resin and an epoxide resin polymerized from prepolymer blends consisting of:

a first prepolymer consisting of:

a repeating unit of formula:

a first end group of formula:

a second end group of formula:

a second prepolymer consisting of:

a repeating unit of formula:

a first end group of formula:

a second end group of formula:

a third prepolymer consisting of:

a repeating unit of formula:

a first end group of formula:

a second end group of formula:

wherein said vinyl ester resin and said epoxide resin are present in a molar ratio of 50/50.

12. The composite material according to claim 1, wherein said arylene ether diphenylsulphone/arylene ether triphenylphosphine copolymer consists of:

a first repeating unit of formula:

a second repeating unit of formula:

13. The composite material according to claim 1, wherein said arylene ether diphenylsulphone/arylene ether triphenylphosphine copolymer exhibits a molar ratio of phosphine oxide groups to sulphone groups ranging from 20/80 to 40/60.

14. The composite material according to claim 13, wherein said arylene ether diphenylsulphone/arylene ether triphenylphosphine copolymer exhibits a molar ratio of phosphine oxide groups to sulphone groups ranging from 20/80 to 40/60.

15. The composite material according to claim 1, wherein said arylene ether diphenylsulphone/arylene ether triphenylphosphine copolymer and said at least one polymerized resin are present within the material in a weight percent ratio ranging from 5/95 to 20/80.

16. The composite material according to claim 15, wherein said arylene ether diphenylsulphone/arylene ether triphenylphosphine copolymer and said at least one polymerized resin are present within the material in a weight percent ratio ranging from 10/90 to 15/85.

17. The composite material according to claim 1, wherein said material exhibits a fracture toughness ($K_{Ic}$) of greater than or equal to 1.3 MPa·m$^{1/2}$.

18. The composite material according to claim 17, wherein the material exhibits a fracture toughness ($K_{Ic}$) of greater than or equal to 1.4 MPa·m$^{1/2}$.

19. The composite material according to claim 18, wherein the material exhibits a fracture toughness ($K_{Ic}$) of greater than or equal to 1.5 MPa·m$^{1/2}$.

* * * * *